March 18, 1958 J. W. BECK 2,827,611

TRANSISTOR DEMODULATOR AND MODULATOR

Filed June 21, 1954 2 Sheets-Sheet 1

*INVENTOR.*

JOHN W. BECK

*BY* William R. Lane

ATTORNEY

INVENTOR.
JOHN W. BECK
BY William R. Lane
ATTORNEY 2,827,611

TRANSISTOR DEMODULATOR AND MODULATOR

John W. Beck, Long Beach, Calif., assignor to North American Aviation, Inc.

Application June 21, 1954, Serial No. 438,191

12 Claims. (Cl. 332—52)

This invention is a reversible output, phase-sensitive demodulator and modulator circuit utilizing transistors.

A transistor is a device generally comprising a body of semi-conductive material and three electrodes. The flow of current through the transistor is controlled by impressing a voltage on the control electrode with respect to another of the electrodes. The use of transistors in electronic circuits is advantageous from the standpoint of size and weight, power requirements, and efficiency. A conventional demodulator known as the "ring demodulator" is considerably improved through the use of transistors. By modification of the circuit, for example, the peak inverse voltage appearing on the diodes can be reduced by as much as a factor of 4. The reference power required by the demodulator is reduced approximately by two orders of magnitude, and the total circuit efficiency is improved by at least a factor of 10. The reference power used in the transistor demodulator or modulator is negligible when no signal is being received. The amplifying characteristics of the transistors can be utilized to obtain a signal gain at the same time the signal is modulated or demodulated.

As a rule, the common diode ring demodulators require relatively large power in the reference signal. The great majority of commercially available germanium diodes have voltage ratings inadequate to meet the requirements placed on them in situations requiring driving current outputs. The ring demodulator using semiconductor diodes must have a reference voltage equal to, or greater than, twice the largest signal voltage. In addition, the peak inverse voltage on the rectifiers is then four times the largest signal voltage. The diodes are usually protected from current overloads by using suitable series resistors, but these resistors must not be too large inasmuch as they also dissipate useful signal energy. The overall circuit efficiency due to the presence of current limiting resistors, is inherently low and, if low load impedance values are used, the D. C. output power relative to the A. C. input power suffers.

It is therefore an object of this invention to provide an improved phase-sensitive demodulator.

It is a further object of this invention to provide a phase-sensitive transistor demodulator and modulator which requires less reference-signal power.

It is another object of this invention to provide a phase-sensitive demodulator and modulator capable of providing signal gain.

It is a further object of this invention to provide a phase-sensitive modulator and demodulator in which the back voltage across the diodes is reduced.

Other objects of invention will become apparent from the following description taken in connection with the accompanying drawings, in which Fig. 1 is a schematic diagram of a half-wave transistor demodulator;

Figure 4:
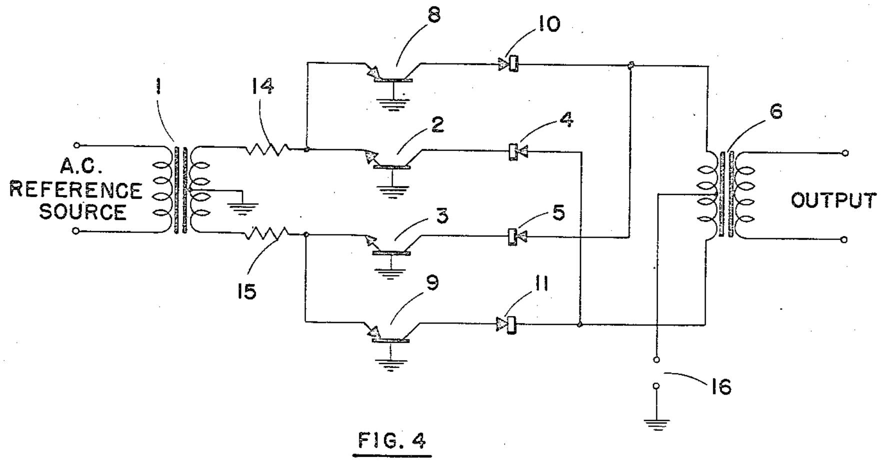

And Fig. 4 is a schematic diagram of a full-wave transistor demodulator or modulator incorporating forcing resistors.

Figure 1:
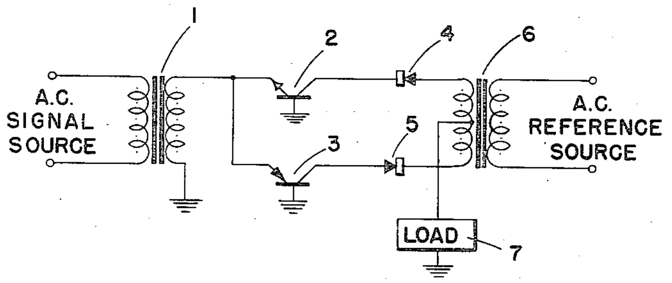

Referring to Fig. 1, a transformer 1 receives the input signal. The secondary of transformer 1 is connected at one end to the emitter of transistor 2 of the NPN type, and to the emitter of a transistor 3 of the PNP type. These transistors are oppositely conducting. In the NPN transistor the conventional current flow is from the collector to the emitter, in the PNP transistor the conventional current flow is from the emitter to the collector. The current flow is controlled, generally, in accordance with the voltage between a control element (the base) of the transistor and the emitter. The other end of transformer 1 is connected to ground. The collectors of the transistors are connected to germanium diodes 4, 5, respectively, which, in turn, are connected to the secondary of transformer 6. The primary of transformer 6 is connected to a reference frequency. The center tap of the secondary of transformer 6 is connected to load 7 which is connected at its remaining side to ground, completing the load circuit. It can be seen that the A. C. signal received at transformer 1 controls the emitter-to-base potential of each of the transistors 2 and 3 and therefore controls the current flowing in the collectors of the transistors to the load. Each said transistor may be seen to be connected in its individual circuit. By "individual circuit" is means that the transistors are not connected in serial driving relationship with each other, but are connected in what more nearly approximates parallel circuit relationship. The signal received at the load is, therefore, amplified according to the characteristics of each of the transistors. The reference signal received at transformer 6 controls the conduction or nonconduction of diodes 4 and 5 and allows them to conduct every other half cycle of the A. C. reference frequency. The signal applied to load 7 is therefore half wave. The device is phase-sensitive by reason of the fact if the A. C. signal and the reference frequency are in phase, the A. C. signal causes one transistor to conduct. If they are out of phase, the other transistor conducts and the current in the load is reversed. In conventional ring demodulators, the A. C. reference source voltage must be at least twice that of the A. C. signal source. Otherwise, the switching of diodes is not controlled by the reference source. In contrast, in the device of the invention, the reference voltage need only be large enough to overcome the signal voltage less the drop across the transistor. The current limiting resistors in series with the diodes are not necessary in the device of the invention, inasmuch as control of signal currents is obtained through the use of transistors. The signal source frequencies and the reference source frequencies are, of course, equal.

Figure 2:
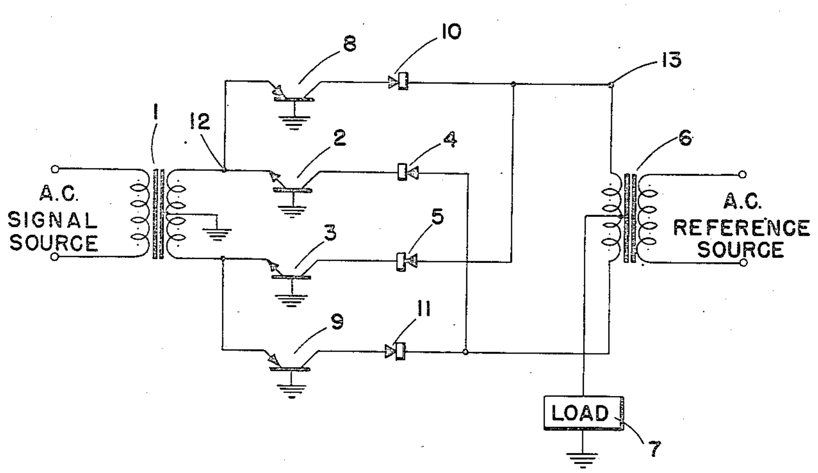
Fig. 2 is a schematic diagram of a full-wave transistor demodulator.

If a full-wave, phase-sensitive demodulator is desired, the illustration of Fig. 2 is utilized in which four transistors and four diodes are incorporated. The secondary of transformer 1 is connected at one end to transistors 2 and 8 which are of opposite types and, at the other end, to transistors 3 and 9 which are of opposite types. The center tap of the secondary is connected to ground. The collector of each transistor is connected to one of respective diodes 4, 10, 5, and 11. Diodes 5 and 10 are connected to one end of the secondary of transformer 6 and diodes 4 and 11 are connected to the other end of the secondary of transformer 6. The center tap of the secondary of transformer 6 is connected to load 7 which, in turn, is connected to ground. In order to show the phase-sensitive capabilities of this circuit, assume that points 12 and 13 are both positive with respect to ground. Point 12 is made positive by reason of the A.-C. signal source and point 13 is made positive by reason of the A.-C. reference source at the same instant. Diodes 10 and 4 (arrows are drawn in the direction of conventional current flow) are prevented from conducting by reason of the positive voltage at point 13. Transistors 2 and 9 are unable to conduct by reason of the positive voltage at point 12. Transistor 3 and diode 5 are the only transistor-diode combination capable of conducting at this time. On the reverse cycle (no phase relationship change between the signal source and the reference source), diodes 5 and 11 are unable to conduct and transistors 8 and 9 are prevented from conducting. In this instance, transistor 2 and diode 4 are the only transistor-diode combination capable of conducting. The current through the load under the given condition is full wave and is unidirectional. Upon 180° phase shift of the signal source wherein point 12 is low and point 13 is high, diodes 10 and 4 are prevented from conducting. Transistor 3 is cut off by the voltage across transformer 1 and transistor 9 and diode 11 conduct to alow current to flow through the load. In the next half cycle, diodes 5 and 11 are prevented from conducting by voltage at point 13 and transistor 2 is prevented from conducting by reason of the voltage at point 12, and transistor 8 and diode 10 conduct and allow current to flow through load 7. It is noted that current flows through load 7 in the opposite direction upon 180° phase shift between the signal and the reference frequency.

Figure 3:
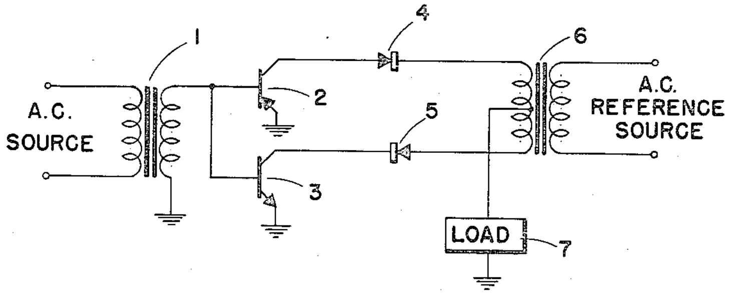
Fig. 3 is a schematic diagram of the device of Fig. 2 in which relative connections of the transistors have been rotated.

Fig. 3 represents a modification of the device of the invention in which the transistor terminals are rotated. The secondary of transformer 1 is connected to the base of each of transistors 2 and 3. The other end of the secondary of transformer 1 is connected to ground. The emitter of each transistor is likewise connected to ground. Therefore, the signal provided by transformer 1 is impressed across each transistor between the base and the emitter. In this illustration, the circuit presents higher input impedance to the signal source and provides higher gain.

It is possible that the A.-C. signal source and the A.-C. reference source be transposed so that the A.-C. signal source drives transformer 6 and the A.-C. reference source drives transformer 1 in which case appropriate adjustment as to impedance magnitudes are necessary. This is accomplished by the use of suitable matching transformers 1 and 6.

In previous demodulators using diodes (which have a limited amount of back resistance), the diodes must be balanced so all of them display equal characteristics in order to provide a balanced output. In order to obtain equal characteristics, parallel resistors and series resistors must be connected in the circuit so that each diode circuit has the same resistance. This was a required "balancing" of a network. Such resistance was necessary to prevent the high reference voltages from causing back current flow through a diode and providing an output when there should be none. The reference voltage in the device of the invention need not be so high as in other demodulators. This is true because of the transistors included in series with the diodes as shown. "Balancing" of diodes is unnecessary. It may be desirable in the instances in which the A.-C. signal source drives transformer 1 and gain is desired from the demodulator that diodes be carefully selected or resistance balancing be done in order to assure zero signal output for zero signal input.

In the device of Fig. 2, a linear response will not be obtained if driven from a low impedance source, because the transistor is not a linear voltage amplifier. If driven from a current source, such as another transistor stage, a linear response is obtained. One method of providing linear output is to bias the emitter circuit with a D.-C. bias but the demodulator would then have a residual output of a certain value. A second method is to place a forcing resistor in series with the emitter lead which, in effect, turns the signal source into a current source. The forcing resistor reduces the possible gain but yields linear output. For selected transistors, a single forcing resistor can be used, thus reducing the number of components needed for a given linearity of output.

Fig. 4 indicates the circuit of Fig. 2 including the forcing resistors 14 and 15.

In order to operate the device of the invention as a modulator, it must be operated in an inverse fashion. That is, if a fixed A.-C. voltage is received at transformer 1 varying the voltage at terminal 16 causes a modulated wave to be received at the output of transformer 6. The output wave consists of a carrier at reference frequency modulated by the varying input voltage at terminal 16. It can be recognized that transformers 1 and 6 are merely coupling networks and may be replaced by conventional R.-C. networks if so desired.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, at least a pair of semiconductive devices each having a control element and each device of a pair being oppositely conducting types, each said semiconductive device being incorporated in an individual circuit, a load circuit connected to receive the output of said semiconductive devices individually, means for coupling a first electrical source to the control elements of said semiconductive devices with like polarity, a respective diode connected in the load circuit of each said semiconductive device, said diodes being oppositely poled with respect to each other, means for coupling a second electrical source to said diodes so as to control the current therethrough, and means coupling a load into the load circuit of said semiconductive devices.

2. In combination, at least a pair of semiconductive devices each having a control element and each device of the pair being oppositely conductive types, each said semiconductive device being incorporated in an individual circuit, a load circuit connected to receive the output of said semiconductive devices individually, means for coupling a first alternating electrical source to the control elements of said semiconductive devices with like polarity, a respective diode connected in the load circuit of each said semiconductive device, said diodes being oppositely poled with respect to each other, means for connecting a second alternating electrical source in the load circuit of said semiconductive devices so as to control the flow of current through said diodes, and means for coupling a load in the load circuit of said semiconductive devices.

3. In combination, at least one pair of semiconductive devices each having a control element and each device of the pair being of oppositely conductive types, means for coupling a first alternating voltage to the control elements of said semiconductive devices with like polarity, a common load connected in the emitter to collector circuit of each said semiconductive device individually, a respective diode connected in the load circuit of each said semiconductive device, said diodes being oppositely poled with respect to each other, means for coupling a second alternating voltage in the load circuit of each said semiconductive device to control the commencement and termination of flow of current through said diodes.

4. In a demodulator, at least one pair of transistors of oppositely conductive types, means for coupling an alternating electrical signal to the control circuit of each said transistor with like polarity, a common load connected in the emitter to collector circuit of each transistor individually, a respective diode in the emitter to collector circuit of each transistor, said diodes being oppositely poled with respect to each other, means for coupling an alternating reference voltage into the load circuit of each said transistor.

5. In a demodulator, one pair of transistors of oppositely conductive types, means for coupling an alternating voltage to the control circuit of each said transistor, a respective diode connected in the collector circuit of each transistor, each diode poled in the direction of conduction of its respective transistor, transformer means the secondary of which is connected at opposite ends to said diodes, and means for coupling a load into the emitter to collector circuit of each said transistor individually.

6. In a demodulator, two pairs of transistors, each of the pair being of oppositely conductive types, a first double-ended electrical coupling means connected at one end to control the current flow in one pair of transistors and at the other end to control the current flow in the other pair of said transistors, a respective diode connected in the load circuit of each said transistor, each said transistor being incroporated in an individual circuit, each said diode being poled in the direction of conduction of its respective transistor, a second double-ended electrical coupling means connected at one end through said respective diodes to one transistor of each pair of transistors and at the other end through said respective diodes to the remaining transistor of each pair, and load coupling means connected in the emitter to collector circuit of said transistors.

7. In combination, two pairs of transistors, each of the pair being of oppositely conductive types, a first double-ended transformer coupling means connected at one end to control the current flow in one pair of transistors and at the other end to control the current flow in the other pair of said transistors, each said transistor connected in an individual circuit, a respective diode connected in the load circuit of each said transistor, each diode poled in the direction of conduction of its respective transistor, a second double-ended transformer coupling means connected at one end through said respective diodes to one transistor of each pair of transistors and at the other end through said respective diodes to the other transistor of each pair of transistors, a common load circuit connected in the emitter to collector circuit of each of said transistors individually.

8. In combination, two pairs of transistors, each of a pair being of oppositely conductive types, a first double-ended transformer coupling means the secondary of which is connected at one end to provide voltage to the emitter to base circuit of each transistor of a pair of transistors, and connected at the other end to provide voltage to the emitter to base circuit of each transistor of the remaining pair of transistors, a respective diode connected in the collector to emitter circuit of each transistor, each said diode poled in the direction of conduction of its respective transistor, a second double-ended transformer coupling means the secondary of which is connected at one end in series circuit with the respective diode and the collector of one transistor of each pair and connected at the other end in series circuit with the respective diodes and each of the collectors of the other transistors, terminal means connected between the electrical centers of the secondaries of said transformers.

9. In combination, two pairs of transistors, each of the pair being of oppositely conductive types, a first double-ended transformer coupling means the secondary of which is connected at one end to provide voltage to the emitter to base circuit of each transistor of a one pair of transistors, each of said transistors being connected in an individual circuit, and connected at the other end to provide voltage to the emitter to base circuit of each transistor of the remaining pair of transistors, each of said transistors being connected in an individual circuit, a respective diode connected in the collector to emitter circuit of each transistor, each diode poled in the direction of conduction of its respective transistor, a double-ended alternating reference voltage source connected at one end through said respective diodes to the collectors of one transistor of each pair and at the other end through said respective diodes to the collectors of the other transistor of each pair, and a load circuit connected between the electrical centers of the secondary of said transformer coupling means and said alternating reference voltage source.

10. In combination two pairs of transistors, each of a pair being of oppositely conductive types, a first double-ended transformer coupling means, the secondary of which is connected at one end to the emitters of one pair of said transistors and connected at the other end to the emitters of said remaining pair of transistors, four diodes, each of said diodes being connected on one side to the collector of a respective transistor and poled in the direction of conduction of its respective transistor, a second double-ended transformer coupling means connected at one end to the remaining side of said diodes connected to one transistor of each pair of transistors and at the other end to the remaining side of said diodes connected to the collectors of the other transistor of each pair of transistors, a load circuit connected between the electrical centers of the secondaries of said transformer coupling means, and the base of each of said transistors being conductively connected to the electrical center of the secondary of said first double-ended transformer coupling means.

11. A pair of semi-conductive devices of oppositely conductive types, each device having at least three electrodes including a control electrode, means for coupling a first electrical source to said control electrodes with like polarity, an impedance having a center tap, a respective diode connected between a second electrode of each said device and respective ends of said impedance, said diodes being mutually oppositely poled, a first circuit means common to both said devices coupled between said center tap and a third electrode of each said device, a second circuit means coupled across said impedance, a load coupled with one of said circuit means, and a second source coupled with the other of said circuit means.

12. A pair of semi-conductive devices of oppositely conductive types, each device having at least three electrodes including a control electrode, means for coupling a first electrical source to both said control electrodes with like polarity, means providing a pair of output circuits each individual to a respective one of said devices, said circuits including load means common to both circuits and a diode individual to each circuit, said diodes being mutually oppositely poled, each said circuit including a second electrical source coupled with opposite polarity in each circuit and series connected with said common load means and the diode and semi-conductive device of each circuit.

References Cited in the file of this patent

UNITED STATES PATENTS

| | | |
|---|---|---|
| 2,673,936 | Harris | Mar. 30, 1954 |
| 2,695,988 | Gray | Nov. 30, 1954 |
| 2,698,392 | Herman | Dec. 28, 1954 |
| 2,724,780 | Harris | Nov. 22, 1955 |